United States Patent [19]

Zimmermann

[11] Patent Number: 5,236,156
[45] Date of Patent: Aug. 17, 1993

[54] MONITORING OF TRACK-TYPE CONVEYOR SYSTEM

[75] Inventor: Rolf Zimmermann, Munich, Fed. Rep. of Germany

[73] Assignee: Buro Patent AG, Glarus, Switzerland

[21] Appl. No.: 859,821

[22] Filed: Mar. 30, 1992

Related U.S. Application Data

[63] Continuation-in-part of Ser. No. 543,740, filed as PCT/CH89/00182 on Oct. 17, 1989, abandoned.

[30] Foreign Application Priority Data

Oct. 20, 1988 [CH] Switzerland ............... 3910/88

[51] Int. Cl.⁵ ............................................. B61L 27/00
[52] U.S. Cl. ................................. 246/5; 246/122 R; 104/88
[58] Field of Search ............... 246/2 R, 2 E, 2 S, 2 F, 246/3, 5, 122 R; 180/168; 104/88

[56] References Cited

U.S. PATENT DOCUMENTS

| | | | |
|---|---|---|---|
| 3,340,821 | 9/1967 | Wesener | 191/22 C X |
| 3,502,038 | 3/1970 | Wesener | 104/88 |
| 3,610,363 | 10/1971 | Hartley | 246/3 X |
| 3,628,624 | 12/1971 | Wesener | . |
| 3,662,167 | 5/1972 | Elcan et al. | 246/2 F |
| 3,933,099 | 1/1976 | Reinhard | 246/5 X |
| 3,948,342 | 4/1976 | Pircher et al. | 180/168 |
| 3,976,272 | 8/1976 | Murray et al. | 246/3 X |
| 4,015,680 | 4/1977 | Pircher et al. | 180/168 |
| 4,056,063 | 11/1977 | Ritter | 104/88 |
| 4,122,523 | 10/1978 | Morse et al. | 246/5 X |
| 4,349,196 | 9/1982 | Smith et al. | 246/5 X |
| 4,566,390 | 1/1986 | Pforte | 104/88 |
| 4,630,216 | 12/1986 | Tyler et al. | 180/168 X |
| 4,974,259 | 11/1990 | Takahashi et al. | 246/5 X |

FOREIGN PATENT DOCUMENTS

0164302 12/1985 European Pat. Off. .
0127566 12/1984 Fed. Rep. of Germany .
2084775 4/1982 United Kingdom .

Primary Examiner—Michael S. Huppert
Assistant Examiner—Scott L. Lowe
Attorney, Agent, or Firm—Herbert Dubno; Andrew Wilford

[57] ABSTRACT

A conveyor system has a track network including a main track, a plurality of branch tracks, and respective intersections at which the main track joins the branch tracks. Respective stations at the branch tracks are each associated with a respective target code. A plurality of trucks displaceable along the track network are shuntable by switches at the intersections from the main track into the branch tracks. Each truck is provided with an array of elements settable to correspond to any of the target codes and respective target-code readers associated with the switches read the target codes of the trucks. Controllers connected between the readers and the respective switches direct the trucks to the stations corresponding to the target codes of the trucks. A monitoring system comprises a permanent identification code on each of the trucks associated with the respective truck and not with the station to which the truck is addressed and identification-code readers along the track network responsive to the identification codes on the trucks. A central computer connected to the readers is responsive to the identification-code readers for monitoring positions of the trucks along the track network. An encoder connected to the central computer is disposed along the network for, in response to the central computer, reprogramming a target code of selected trucks passing the encoder.

8 Claims, 2 Drawing Sheets

MONITORING OF TRACK-TYPE CONVEYOR SYSTEM

CROSS REFERENCE TO RELATED APPLICATIONS

This application is a continuation-in-part of patent application 07/543,740 filed 18 June 1990, now abandoned, as the national phase of PCT/CH89/00182 filed 17 October 1989 and itself based on Swiss national application 3910/88-5 filed 20 October 1988 under the International Convention.

FIELD OF THE INVENTION

The present invention relates to a conveyor system where a plurality of cars are routed over a track network between a plurality of stations. More particularly this invention concerns a monitoring system for such a conveyor system.

BACKGROUND OF THE INVENTION

A standard conveyor of this type has track-guided trucks which travel along a track network provided with switch points at which the trucks can be shunted off to branch tracks, or to loading or unloading stations. Each track carries a target code that is set according to the intended destination of the truck and each switch point is provided with a device that can read these codes. When a reader determines based on the code of an arriving truck that this truck should be switched to a branch track or a station, it appropriately operates the respective switch. The network invariably includes at least one endless main track about which the trucks travel until they are picked off at a switch point. Such arrangements are described in U.S. Pat. Nos. 3,340,821 and 3,502,038. In such conveyors, the target codes consist of one or more electromagnets arranged on the conveyor truck and settable in binary fashion to form the desired destination code.

Such conveyor installations function well, however it is not possible to monitor the operation situation, for instance to establish whether a certain truck really reached its target station, according to the initial setting. Furthermore if, for instance, a destination code is set that corresponds to no existing destination, the respective truck will simply continue to move around the loop and, in effect, become lost.

On the other hand, modern conveyor installations are known, such as from European open application 164,302, which comprise a central control unit which not only makes it possible to monitor the travel of the truck towards its target station, but also insures a concurrent monitoring of the conveyor installation. In this case the trucks are provided with individual identification codes which are also read and transmitted to the central control unit. In the central control unit both codes are processed and serve for the control of the switch points and the monitoring of the conveyor installation. Such control equipment is not suitable for retrofitting to an existing conveyor installation of the above-mentioned kind.

OBJECTS OF THE INVENTION

It is therefore an object of the present invention to provide an improved monitoring system which can readily be retrofitted to an existing conveyor where each truck carries the currently valid destination code.

Another object is the provision of such an improved monitoring system which can readily be retrofitted to an existing conveyor where each truck carries the currently valid destination code which overcomes the above-given disadvantages, that is which makes it possible to ascertain if a truck in such a system has become lost.

SUMMARY OF THE INVENTION

The instant invention is a monitoring system used in a conveyor system having a track network including a main track, a plurality of branch tracks, and respective intersections at which the main track joins the branch tracks. Respective stations at the branch tracks are each associated with a respective target code. A plurality of trucks displaceable along the track network are shuntable by switches at the intersections from the main track into the branch tracks. Each truck is provided with an array of elements settable to correspond to any of the target codes and respective target-code readers associated with the switches read the target codes of the trucks. Controllers connected between the readers and the respective switches direct the trucks to the stations corresponding to the target codes of the trucks. The monitoring system comprises a permanent identification code on each of the trucks associated with the respective truck and not with the station to which the truck is addressed and identification-code readers along the track network responsive to the identification codes on the trucks. A central computer connected to the readers is responsive to the identification-code readers for monitoring positions of the trucks along the track network. An encoder connected to the central computer is disposed along the network for, in response to the central computer, reprogramming a target code of selected trucks passing the encoder.

Thus with this system it is possible to centrally track the positions of the trucks by monitoring the identification codes read at the identification stations and determine when a truck is unable to reach its destination. In this case the target code of a truck unable to reach its destination can be reset to correspond to the code of a station serving as accumulation station. At the accumulation station the contents of the truck, as these trucks are normally used to move inventory around, is checked as well as its routing and any mistakes are corrected and the truck can be sent out again.

A particular advantage of this system is that the basic truck routing and control system and the supplementary monitoring system can essentially coexist independently of each other, or can complement each other in certain cases. With the supplementary monitoring installation, travel of the trucks from the sending station to the target station can be monitored and by means of encoding devices a truck can be reprogrammed for instance to take the shortest route, or a misdirected truck can for instance be redirected to the target station or directed towards a central accumulation station.

In simple conveyors, it can suffice to provide the stations with receivers of the aforementioned kind. In more complicated conveyors separate identification-code readers can be provided, since in this case the conveyor trucks can be monitored continuously during their travel along the conveyor tracks. Such receivers arranged along the conveyor tracks can only read identification codes, but they can also contain readers for target codes.

It also is effective when the receivers contain microprocessors which can process the signals received from the identification-code readers and feed them to a central computer. This way the monitoring installation can actively intervene in the operation of the conveyor. The central computer is in turn connected to the switches so that for instance when the target station is occupied or when the target code was wrongly set, the sending process of the truck can be interrupted at the sending station. An encoder provided along the track with an identification-code and target-code reader can do the reset on the fly, that is while a lost truck or a truck that for some reason cannot get to its destination is passing.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
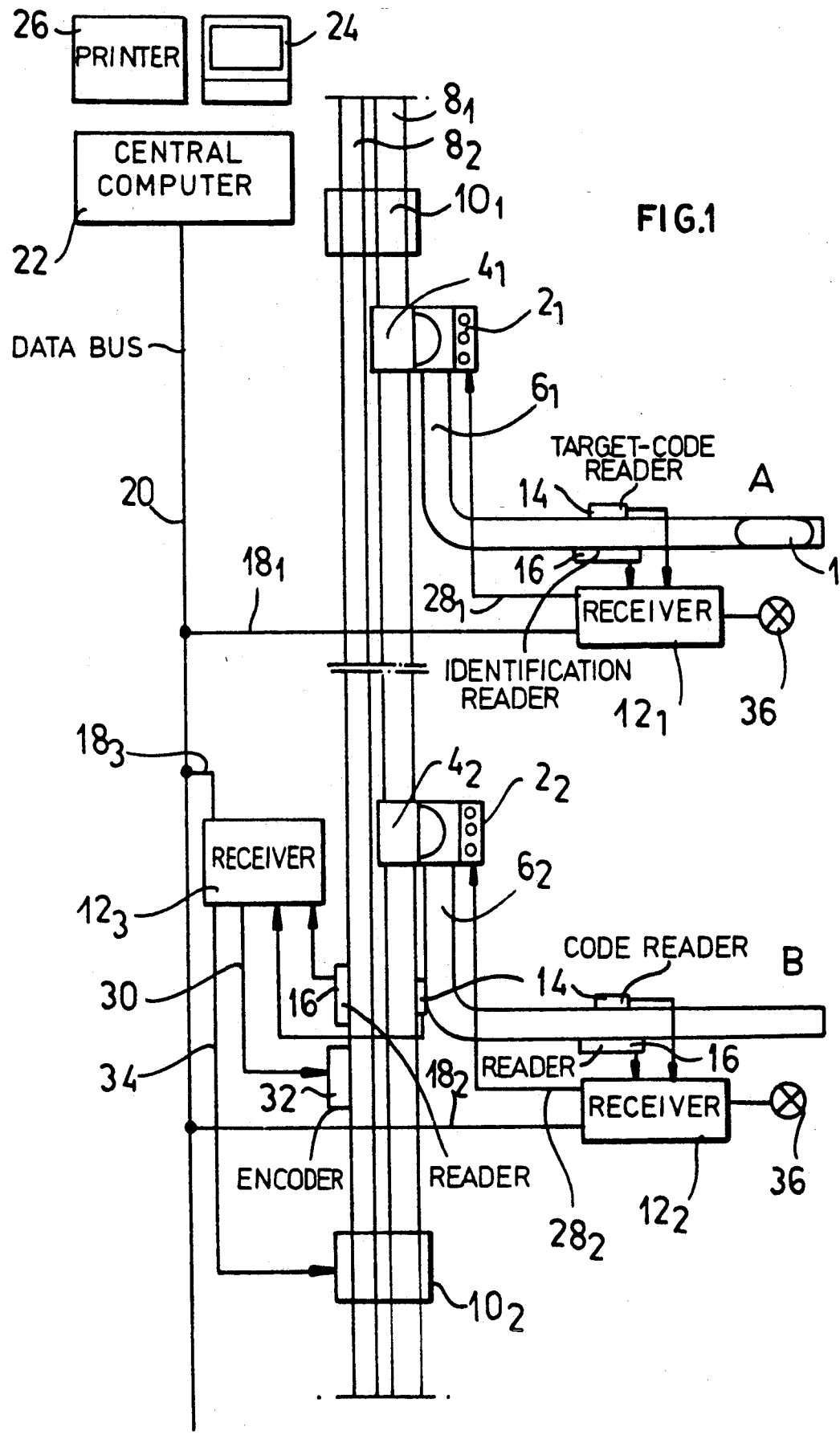
FIG. 1 is a largely schematic top view of a detail of a conveyor and monitoring system according to the invention.
Figure 2:
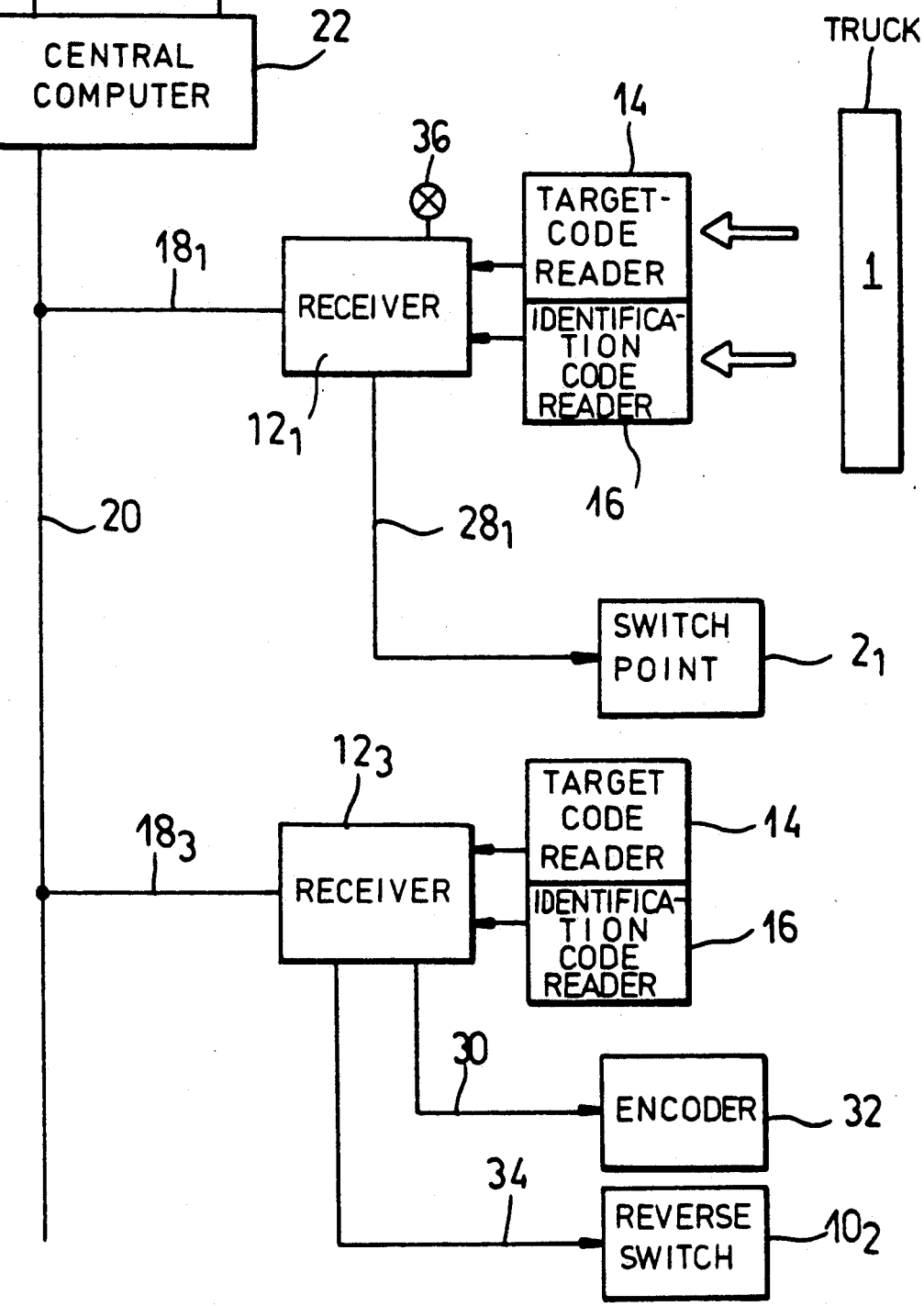
FIG. 2 is a block diagram of the monitoring system of FIG. 1.

The conveyor system of FIG. 1 is the type described in U.S. Pat. Nos. 3,340,821 and 3,502,038 and developed according to FIG. 10 of European open application 164,302. In it target codes of stations A and B are set in arrays of slide magnets on a conveyor truck 1 and can be detected by readers or scanners $2_1$, $2_2$ at switches $4_1$, $4_2$, whereupon these switches are actuated according to the detected target code. The target codes serve for the transfer of a conveyor truck 1 between a secondary or branch track $6_1$, $6_2$ and a main track $8_1$ or $8_2$. In the shown example, the conveyor tracks are beam rails, but they also can be tracks laid out on or in the ground, for instance as in U.S. Pat. Nos. 3,628,624, 3,948,342, and 4,015,680, with conveyor trucks 1 travelling on them. Reverse switches $10_1$, $10_2$ are arranged in the main conveyor track $8_1$, $8_2$ and serve to transfer a conveyor truck 1 from the main track $8_1$ to the main track $8_2$ and vice versa.

The supplementary monitoring installation according to the invention comprises receivers or readers $12_1$, $12_2$, $12_3$ which are located at the stations A and B and also along the main tracks $8_1$, $8_2$. Such receivers $12_1$, $12_2$, $12_3$ are each equipped with a reader 14 for target codes and with a reader 16 for identification codes. According to the invention each truck 1 is provided with an individual identification code that is specific to the respective truck, that is that has nothing to do with its destination and that normally is unchanged for the service life of the truck. Such an identification code can for instance be a bar code which can be scanned by optical readers 16. The picked-up target code and the picked-up identification code are processed in the receiver by a microprocessor and fed via a connection circuit $18_1$, $18_2$, $18_3$ to a data bus bar 20 leading to a central computer 22, which for instance can be a personal computer. A screen 24 and a printer 26 are connected to the central computer 22.

The receivers $12_1$, $12_2$ at the stations A and B are connected via control circuits $28_1$, $28_2$ with the respective switches $4_1$, $4_2$. The receiver $12_3$ arranged along the main tracks $8_1$, $8_2$ can be connected via a control circuit 30 with an encoder 32 that can reset the destination code of a truck 1 in it and/or via the control circuit 34 with a reverse switch $10_2$. The encoder 32 can for instance be built like the one described in U.S. Pat. No. 4,566,390 and can serve for resetting the destination codes to their initial position. This reset code can correspond to the target code of an accumulation station. However, such an encoder 32 can also be designed according to the U.S. Pat. No. 5,056,063 or British patent 2,084,757 which sets the target code to the code of an accumulation station or optionally to the code of a sending station.

In addition the receivers $12_1$, $12_2$ of the stations A and B can be equipped with acoustic or optical alarms 36, indicating a malfunction, for instance when the established target station is occupied or the established target code does not exist.

The monitoring installation can be fitted to an existing conveyor without changing the control techniques of the already existing conveyor. The individual units of the monitoring installation can be added to the known conveyor, under certain circumstances it is not even required to interrupt the operation of the conveyor for the retrofit. The monitoring installation does not take over any of the control tasks of the known conveyor and is operated independently therefrom, which means that it solely supplements the known conveyor. When the monitoring installation fails, the conveyor is not disabled.

The target codes and the identification codes can consist not only of slide magnets or bar codes, but can contain all known codings. The readers can be designed correspondingly. Optionally, the existing scanning devices for the target codes can be used directly for the reading devices of the monitoring installations.

With the monitoring installation it is possible to carry out the most various tasks which are also mentioned in the European open application 164,302, namely:

1. Establishing the travel time of each conveying order and comparing this value with a set maximum time value for carrying out the order.

2. Establishing whether a conveyor truck 1 has effectively reached its target and indicating a possibly wrongly accessed station.

3. If a conveyor truck 1 travels with a target code which does not exist in the installation, the possibility to return the conveyor truck 1 to the sending station or to direct it to an accumulation station.

4. If a conveyor truck 1 passes several times in front of a receiver, it is possible to change its target code with an encoder to the target code of an accumulation station or substitute station. In the central computer it is possible to store the original code, and at the substitute station this information can be delivered to the printer.

5. The totality of movements in the conveyor installation can be stored in the central computer for a certain time period and shown on the screen and printed out by the printer.

6. The information stored in the central computer can be accessed and evaluated according to certain criteria, e.g. all movements of a certain conveyor truck 1 in a predetermined time period can be indicated and printed out.

7. The information stored in the central computer can be used for maintenance instructions. Thus the distances traveled by the various trucks can be logged and maintenance scheduled in accordance with the use each truck is subjected to.

8. With appropriate distribution of receivers along the conveyor, it is possible to seize and calculate the length of track travelled by one truck 1 until it reaches its target, and where a certain container is located in the conveyor installation can be displayed continuously or at any time. If a conveyor truck 1 passes a receiver arranged along the track path, it is possible to know that at each repeated passing a certain computable additional stretch already travelled by the conveyor truck 1 has to be added. If the conveyor truck 1 passes repeatedly by one control point indicated by the receiver and the target code is correct, this means that the target station was occupied and the conveyor truck 1 has to travel one more round.

9. The current occupation of each station can be established, indicated and taken into account.

I claim:

1. A conveyor system comprising:
    a track network including
        a main track,
        branch tracks,
        a plurality of stations on the branch tracks each associated with a respective target code, and
        intersections at which the branch tracks join the main track;
    a plurality of tracks displaceable along the track network;
    means on each truck including a respective array of elements settable to correspond to any of the target codes;
    respective switches at the intersections operable to shunt the tracks from the main track to the respective branch track;
    means including respective readers associated with the switches for reading the target codes of the trucks at the respective switches;
    respective control means connected between the readers and the respective switches for operating the switches to direct the trucks to the stations corresponding to the target codes of the trucks;
    an identification code on each of the trucks associated with the respective truck and not with the station to which the truck is addressed;
    identification-code readers at the target-code readers responsive to the identification codes on the trucks;
    a central computer connected to the identification-code readers for monitoring positions of the trucks along the track network; and
    an encoder connected to the central computer and disposed along the network for, in response to the central computer, reprogramming target codes of selected trucks passing the encoder.

2. The conveyor defined in claim 1 wherein at least one further reader is provided along the track and has an identification-code reader and a target-code reader, the further reader being connected with the central computer.

3. The conveyor defined in claim 1 wherein the readers comprise microprocessors.

4. The conveyor defined in claim 1 wherein the readers receive signals from the central computer for controlling the switches.

5. The conveyor defined in claim 1, further comprising a screen display connected to the central computer.

6. The conveyor defined in claim 1, further comprising a printer connected to the central computer.

7. In a conveyor system comprising:
    a track network including a main track, a plurality of branch tracks, and respective intersections at which the main track joins the branch tracks;
    respective stations at the branch tracks, each station being associated with a respective target code;
    respective switches at the intersections;
    a plurality of trucks displaceable along the track network and shuntable by the switches from the main track into the branch tracks;
    means on each truck including an array of elements settable to correspond to any of the target codes;
    means including respective target-code readers associated with the switches for reading the target codes of the trucks;
    respective means connected between the readers and the respective switches for directing the trucks to the stations corresponding to the target codes of the trucks; a monitoring system comprising:
    a permanent identification code on each of the trucks associated with the respective truck and not with the station to which the truck is addressed;
    identification-code readers along the track network responsive to the identification codes on the trucks;
    a central computer connected to the readers and responsive to the identification-code readers thereof for monitoring positions of the trucks along the track network; and
    an encoder connected to the central computer and disposed along the network for, in response to the central computer, reprogramming target codes of selected trucks passing the encoder.

8. A method of operating a conveyor system comprising:
    a track network including a main track, a plurality of branch tracks, and respective intersections at which the main track joins the branch tracks;
    respective stations at the branch tracks, each station being associated with a respective target code;
    respective switches at the intersections;
    a plurality of trucks displaceable along the track network and shuntable by the switches from the main track into the branch tracks;
    means on each truck including a array of elements settable to correspond to any of the target codes;
    means including respective readers associated with the switches for reading the target codes of the trucks;
    respective means connected between the readers and the respective switches for directing the trucks to the stations corresponding to the target codes of the trucks;
    the method comprising the steps of:
        providing each truck with a permanent identification code associated with the respective truck and not with the station to which the truck is addressed;
        reading the identification codes of the trucks at identification stations along the track network;
        centrally tracking the positions of the trucks by monitoring the identification codes read at the identification stations and determining when a truck is unable to reach its destination;
        resetting the target code of a truck unable to reach its destination to correspond to the code of a station serving as accumulation station.

* * * * *